(12) United States Patent
Meng et al.

(10) Patent No.: US 11,680,173 B2
(45) Date of Patent: Jun. 20, 2023

(54) GRAPHENE-ENABLED ANTI-CORROSION COATING

(71) Applicant: Nanotek Instruments, Inc., Dayton, OH (US)

(72) Inventors: Fan-Chun Meng, Taipei (TW); Yi-jun Lin, Taoyuan (TW); Shaio-yen Lee, New Taipei (TW); Wen Y. Chiu, Taipei (TW); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 333 days.

(21) Appl. No.: 15/973,045

(22) Filed: May 7, 2018

(65) Prior Publication Data

US 2019/0338146 A1 Nov. 7, 2019

(51) Int. Cl.

| C08K 3/04 | (2006.01) |
|---|---|
| C09D 5/08 | (2006.01) |
| C09D 175/04 | (2006.01) |
| C09D 175/02 | (2006.01) |
| C09D 149/00 | (2006.01) |
| C09D 163/00 | (2006.01) |
| C23F 11/173 | (2006.01) |
| C08K 3/32 | (2006.01) |
| C08K 3/08 | (2006.01) |

(52) U.S. Cl.
CPC ............ C09D 5/084 (2013.01); C09D 149/00 (2013.01); C09D 163/00 (2013.01); C09D 175/02 (2013.01); C09D 175/04 (2013.01); C23F 11/173 (2013.01); C08K 3/042 (2017.05); C08K 3/08 (2013.01); C08K 2003/0812 (2013.01); C08K 2003/0893 (2013.01); C08K 2003/328 (2013.01)

(58) Field of Classification Search
CPC ................ C08K 3/042; C09D 163/00
See application file for complete search history.

(56) References Cited

U.S. PATENT DOCUMENTS

| 2,798,878 | A | 7/1957 | Hummers | |
| 7,071,258 | B1 | 7/2006 | Jang et al. | |
| 11,186,729 | B2 | 11/2021 | Lin | |
| 2002/0182506 | A1 | 12/2002 | Cagle | |
| 2003/0213533 | A1 | 11/2003 | Sako et al. | |
| 2004/0197669 | A1 | 10/2004 | Saidi et al. | |
| 2005/0271574 | A1 | 12/2005 | Jang et al. | |
| 2008/0048152 | A1 | 2/2008 | Jang et al. | |
| 2009/0072199 | A1* | 3/2009 | Lewarchik | C08L 63/00 252/396 |
| 2011/0049437 | A1 | 3/2011 | Crain et al. | |
| 2011/0229761 | A1 | 9/2011 | Cui et al. | |
| 2012/0074430 | A1 | 3/2012 | Lee et al. | |
| 2012/0077039 | A1 | 3/2012 | Lee et al. | |
| 2015/0044565 | A1 | 2/2015 | Wang et al. | |
| 2015/0129809 | A1* | 5/2015 | Gauthy | H01B 1/24 252/511 |
| 2015/0179294 | A1 | 6/2015 | Kim et al. | |
| 2015/0303487 | A1 | 10/2015 | kamai et al. | |
| 2016/0024310 | A1* | 1/2016 | McMullin | C09D 7/62 428/418 |
| 2016/0026846 | A1 | 1/2016 | Lin et al. | |
| 2016/0059444 | A1* | 3/2016 | Wang | C01B 32/20 423/448 |
| 2016/0160079 | A1 | 6/2016 | Shikauchi et al. | |
| 2016/0168391 | A1* | 6/2016 | Costa | C09D 7/70 428/408 |
| 2016/0280931 | A1 | 9/2016 | Liu et al. | |
| 2017/0037257 | A1* | 2/2017 | Yang | C09D 5/24 |
| 2017/0225233 | A1 | 8/2017 | Zhamu et al. | |

(Continued)

FOREIGN PATENT DOCUMENTS

| CN | 102568641 A | 7/2012 |
| CN | 103013229 A | 4/2013 |

(Continued)

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
Karlicky et al., "Halogenated Graphenes: Rapidly Growing Family of Graphene Derivatives" ACS Nano (2013) vol. 7, No. 8, pp. 6434-6464.
Bazylewski et al., "Graphene Thin Films and Graphene Decorated with Metal Nanoparticles" Chapter 1, Crystalline and Non-crystalline Solids, Intech, p. 3-16.
CN 2019800452226 Office Action dated Sep. 1, 2021; 11 pages.

(Continued)

*Primary Examiner* — Margaret G Moore

(57) ABSTRACT

Provided is a graphene-based aqueous coating suspension comprising multiple graphene sheets, particles of an anti-corrosive pigment or sacrificial metal, and a waterborne binder resin dissolved or dispersed in water, wherein the multiple graphene sheets contain single-layer or few-layer graphene sheets selected from a pristine graphene material having essentially zero % of non-carbon elements, or a non-pristine graphene material having 0.001% to 47% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the coating suspension does not contain a silicate binder or microspheres dispersed therein. Also provided is an object or structure coated at least in part with such a coating.

10 Claims, 2 Drawing Sheets

(56) References Cited

U.S. PATENT DOCUMENTS

| | | | |
|---|---|---|---|
| 2017/0327729 A1* | 11/2017 | Salla | C09K 8/68 |
| 2018/0037757 A1* | 2/2018 | Walters | C09D 11/324 |
| 2018/0053931 A1 | 2/2018 | Zhamu et al. | |
| 2018/0072863 A1 | 3/2018 | Scheffer et al. | |
| 2018/0179345 A1* | 6/2018 | Al-Harthi | C08J 5/005 |
| 2018/0179359 A1* | 6/2018 | Jang | C08K 3/042 |
| 2019/0338146 A1 | 11/2019 | Meng et al. | |
| 2019/0345344 A1 | 11/2019 | Meng et al. | |
| 2019/0345345 A1 | 11/2019 | Meng et al. | |

FOREIGN PATENT DOCUMENTS

| | | | |
|---|---|---|---|
| CN | 104371500 A | | 2/2015 |
| CN | 104789092 A | | 7/2015 |
| CN | 105601973 A | | 5/2016 |
| CN | 105623473 A | | 6/2016 |
| CN | 105838195 A | | 8/2016 |
| CN | 105860815 A | | 8/2016 |
| CN | 106810989 A | | 6/2017 |
| CN | 106833191 A | | 6/2017 |
| CN | 106833207 A | | 6/2017 |
| CN | 107325686 A | | 11/2017 |
| CN | 107353773 A | | 11/2017 |
| CN | 107384084 A | | 11/2017 |
| CN | 107936767 A | | 4/2018 |
| EP | 2886616 A1 | | 6/2015 |
| EP | 3023248 A1 | | 5/2016 |
| GB | 2535887 | * | 8/2016 |
| JP | 2013064069 A | | 4/2013 |

OTHER PUBLICATIONS

Hebbar et al., "Probing the morphology and anti-organic fouling behaviour of a polyetherimide membrane modified with hydrophilic organic acids as additives" Royal Society of Chemistry (2015) DOI: 10.1039/c5nj01095k.

Hwang et al., "Enhanced Mechanical Properties of Graphene/Copper Nanocomposites Using a Molecular-Level Mixing Process" Adv. Mater. (2013) vol. 25, pp. 6724-6729.

Licari, "Adhesives Technology for Electronic Applications: Materials, Processing, Reliability" Second Edition, William Andrew (2011) p. 82.

Lonkar, "Recent Advances in Chemical Modifications of Graphene" Nano Research (2015) vol. 8, No. 4, pp. 1039-1074.

PCT/US19/31090 International Search Report and Written Opinion dated Aug. 19, 2019, 14 pages.

PCT/US19/31256 International Search Report and Written Opinion dated Aug. 19, 2019, 19 pages.

PCT/US19/40903 International Search Report and Written Opinion dated Oct. 25, 2019, 15 pages.

Stevenson, Humus Chemistry: Genesis, Composition, Reactions (1982) pp. 258-263, John Wiley & Sons, New York.

U.S. Appl. No. 15/973,651 Nonfinal Office Action dated Mar. 18, 2021, 11 pages.

U.S. Appl. No. 15/973,651; Final Office Action dated Oct. 21, 2021; 21 Pages.

U.S. Appl. No. 15/973,656 Non-Final Office Action dated Oct. 27, 2021; 31 pages.

U.S. Appl. No. 15/973,656 Final Office Action dated Jun. 23, 2020, 10 pages.

U.S. Appl. No. 15/973,656 Nonfinal Office Action dated Dec. 19, 2019, 9 pages.

U.S. Appl. No. 15/973,656 Nonfinal Office Action dated Nov. 19, 2020, 10 pages.

U.S. Appl. No. 16/030,105 Final Office Action dated Mar. 19, 2021, 12 pages.

U.S. Appl. No. 16/030,105 Nonfinal Office Action dated Oct. 27, 2020, 12 pages.

Yousefi et al., "Self-alignment and high electrical conductivity of ultralarge graphene oxide-polyurethane nanocomposites" J. Mater. Chem. (2012) vol. 22, pp. 12709-12717.

EP Application No. 19800863.3; Extended European Search Report dated Jan. 27, 2022; 9 pages.

U.S. Appl. No. 15/973,651; Non-Final Office Action dated Mar. 24, 2022; 17 pages.

U.S. Appl. No. 15/973,656; Final Office Action dated Apr. 29, 2022; 32 pages.

U.S. Appl. No. 15/973,651; Final Office Action dated Oct. 6, 2022; 18 pages.

U.S. Appl. No. 15/973,656; Non-Final Office Action dated Sep. 12, 2022; 34 pages.

* cited by examiner

GRAPHENE-ENABLED ANTI-CORROSION COATING

FIELD OF THE INVENTION

The present invention relates generally to the field of anti-corrosion coating and, more particularly, to a graphene-enabled coating composition and a method of operating same.

BACKGROUND OF THE INVENTION

Corrosion of metallic materials is a costly problem. For example, the cost of corrosion-induced issues accounts for 2% to 5% of the annual gross domestic product (GDP) in the USA. Corrosions occurs to both ferrous metals (e.g. iron and steel) and non-ferrous metals (e.g. aluminum, copper, etc.). These metallic materials are commonly used in marine and off-shore structures, bridges, containers, refineries, powerplants, storage tanks, cranes, windmills, airports, petrochemical facilities, etc.

Corrosion resistant coatings protect metal components against degradation due to moisture, salt spray, oxidation, or exposure to a variety of environmental or industrial chemicals. Anti-corrosion coating enables added protection of metal surfaces and acts as a barrier against the contact between corrosive agents and the metal substrates to be protected. In addition to corrosion prevention, many of the coatings also provide improved abrasion resistance, non-stick performance and chemical protection. Coatings with anti-corrosive properties ensure metal components have the longest possible lifespan.

As an example, an anti-corrosive coating for protecting steel structures includes a zinc primer wherein zinc is used as a conductive pigment to produce an anodically active coating. Zinc acts as a sacrificial anodic material that protects the steel substrate, which becomes the cathode. The resistance to corrosion is presumably dependent upon the transfer of galvanic current by the zinc primer and the steel substrate remains galvanically protected provided the electrical conductivity in the system is maintained and there is sufficient zinc to act as the anode. In order to meet these requirements, zinc primers are typically formulated to contain a high loading of zinc particles (e.g. as high as 80% by weight of zinc) and zinc pigment particles in zinc primers are packed closely together. However, a high zinc loading means a high level of difficulty in dispersing solid contents in a liquid medium, difficulty in applying the primer onto steel surfaces to be protected, excessively thick and dense coatings, and high costs. Other coating systems for protecting other types of metallic structures also have serious drawbacks.

Thus, it remains highly desirable to develop improved anti-corrosion coatings. A specific object of the present invention is a new coating system that requires a lesser amount of an anodic or sacrificial material.

SUMMARY OF THE INVENTION

The present invention provides a graphene-based aqueous coating suspension comprising multiple graphene sheets, particles of an anti-corrosive pigment or sacrificial metal, and a waterborne binder resin dissolved or dispersed in water, wherein the multiple graphene sheets contain single-layer or few-layer graphene sheets selected from a pristine graphene material having essentially zero % of non-carbon elements, or a non-pristine graphene material having 0.001% to 47% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. The non-pristine graphene material can have 1% to 30% by weight of non-carbon elements selected from O, H, N, F, Cl, Br, I, B, P, or a combination thereof. The coating suspension does not contain microspheres (such as glass, ceramic, and polymeric microspheres). In certain embodiments, the coating suspension does not contain a silicate binder.

In certain embodiments, the anti-corrosive pigment or sacrificial metal is selected from aluminum, chromium, zinc, beryllium, magnesium, an alloy thereof, zinc phosphate, or a combination thereof.

The waterborne binder resin may preferably contain a waterborne thermoset resin selected from water-soluble or dispersible epoxy resin, water-soluble or dispersible polyurethane resin, water-soluble or dispersible urethane-urea resin, water-soluble or dispersible phenolic resin, water-soluble or dispersible acrylic resin, water-soluble or dispersible alkyd resin, or a combination thereof.

The coating suspension may further comprise other coating/paint ingredients as will be apparent to a skilled person in the art. Examples of such ingredients are fillers, additives (e.g. surfactants, dispersants, defoaming agents, catalysts, accelerators, stabilizers, coalescing agents, thixotropic agents, anti-settling agents, and dyes), coupling agents, extenders, conductive pigments, electron-conducting polymers, or a combination thereof. Again, the coating suspension does not contain microspheres of glass, ceramic, or polymer, etc.

The conductive pigment may be selected from acetylene black, carbon black, expanded graphite flake, carbon fibers, carbon nanotubes, mica coated with antimony-doped tin oxide or indium tin oxide, or a mixture thereof The electron-conducting polymer is preferably selected from the group consisting of polydiacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives, and combinations thereof.

In some embodiments, the chemical functional group attached to functionalized graphene sheets is selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

Alternatively, the functional group attached to graphene sheets contains a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups, derivatives thereof,

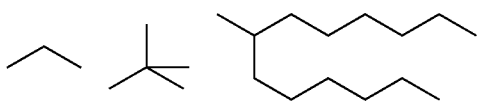

-continued

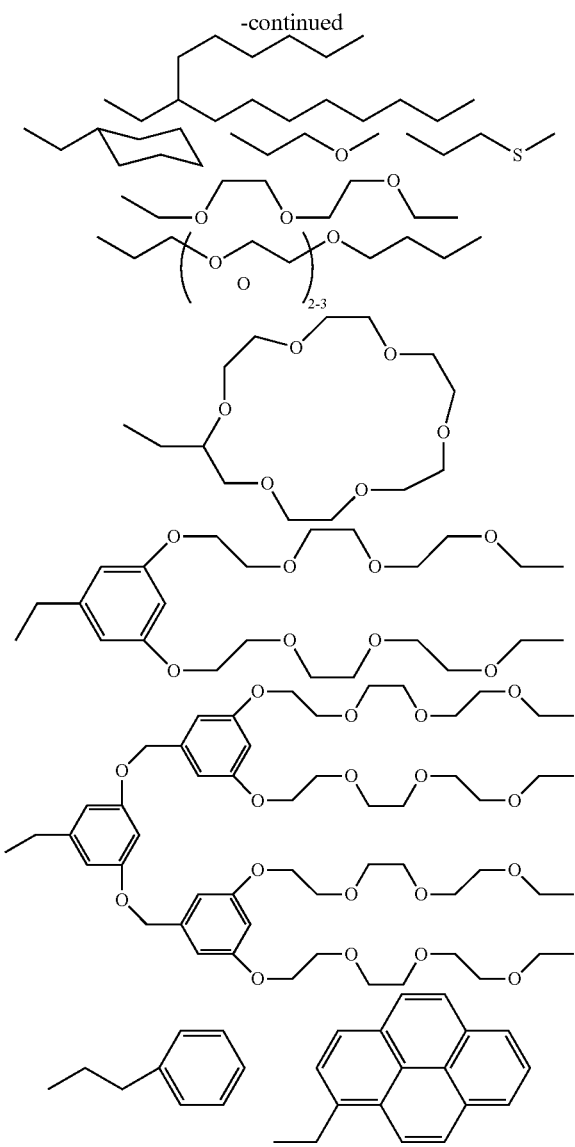

and combinations thereof.

In certain embodiments, the functional group is selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_y$ $R'_{3-y}$, $Si(-O-SiR'_2-)OR'$, R'', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

The functional group may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_yR'_{3-y}$, $R'Si(-O-SiR'_2-)OR'$, R'—R'', R'—N—CO, $(-C_2H_4O-)_wH$, $(-C_3H_6O-)_wH$, $(-C_2H_4O)_w-R'$, $(C_3H_6O)_w-R'$, R', and w is an integer greater than one and less than 200.

The invention also provides an object or structure coated at least in part with a coating comprising multiple graphene sheets, particles of an anti-corrosive pigment or sacrificial metal, and a waterborne binder resin that bonds the graphene sheets and the particles of an anti-corrosive pigment or sacrificial metal together and bonds them to a surface of the object or structure, wherein the multiple graphene sheets contain single-layer or few-layer graphene sheets selected from a pristine graphene material having essentially zero % of non-carbon elements, or a non-pristine graphene material having 0.001% to 47% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein the coating does not contain a silicate binder or microspheres dispersed therein.

The anti-corrosive pigment or sacrificial metal in the coating may be selected from aluminum, chromium, zinc, beryllium, magnesium, an alloy thereof, zinc phosphate, or a combination thereof. The coating applied on the object or structure typically has a thickness from 1 nm to 10 mm, from typically from 10 nm to 1 mm. In certain embodiments, the object or structure is metallic.

The coating applied on the object or structure may contain a waterborne binder resin selected from an ester resin, a neopentyl glycol (NPG), ethylene glycol (EG), isophthalic acid, a terephthalic acid, a urethane resin, a urethane ester resin, an urethane-urea resin, an acrylic resin, an acrylic urethane resin, derivatives thereof, or a combination thereof.

The waterborne binder resin may contain a curing agent and/or a coupling agent in an amount of 1 to 30 parts by weight based on 100 parts by weight of the binder resin.

For the coating applied on the object or structure, the waterborne binder resin may contain a thermally curable resin containing a polyfunctional epoxy monomer selected from diglycerol tetraglycidyl ether, dipentaerythritol tetraglycidyl ether, sorbitol polyglycidyl ether, polyglycerol polyglycidyl ether, pentaerythritol polyglycidyl ether, derivatives thereof, or combinations thereof.

In certain embodiments, the waterborne binder resin contains a thermally curable resin containing a bi- or trifunctional epoxy monomer selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-epoxycyclohexane) methyl 3,4-epoxycylohexylcarboxylate, derivatives thereof, and mixtures thereof.

In certain embodiments, the waterborne binder resin contains an UV radiation curable resin or lacquer selected from acrylate and methacrylate oligomers, (meth)acrylate (acrylate and methacrylate), polyhydric alcohols and their derivatives having (meth)acrylate functional groups, including ethoxylated trimethylolpropane tri(meth)acrylate, tripropylene glycol di(meth)acrylate, trimethylolpropane tri(meth) acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth) acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

In certain embodiments, the object or structure is a metallic reinforcing material or member. The object or structure may be a concrete structure, a bridge.

The invention also provides a method of inhibiting corrosion of a structure or object having a surface, the method comprising coating at least a portion of the surface with the presently invented coating suspension described above and at least partially removing water from the suspension, upon completion of the coating step.

In this method, the anti-corrosive pigment or sacrificial metal is selected from aluminum, chromium, zinc, beryllium, magnesium, an alloy thereof, zinc phosphate, or a combination thereof. In the method, the waterborne binder resin preferably contains a waterborne thermoset resin selected from water-soluble or dispersible epoxy resin, water-soluble or dispersible polyurethane resin, water-soluble or dispersible phenolic resin, water-soluble or dispersible acrylic resin, water-soluble or dispersible alkyd resin, or a combination thereof. The non-pristine graphene material preferably has 1% to 30% by weight of non-carbon elements selected from O, H, N, F, Cl, Br, I, B, P, or a combination thereof. The method may further comprise a carrier, filler, dispersant, surfactant, defoaming agent, catalyst, accelerator, stabilizer, coalescing agent, thixothropic agent, anti-settling agent, color dye, a coupling agent, an extender, a conductive pigment, an electron-conducting polymer, or a combination thereof.

DESCRIPTION OF THE PREFERRED EMBODIMENTS

Figure 1:
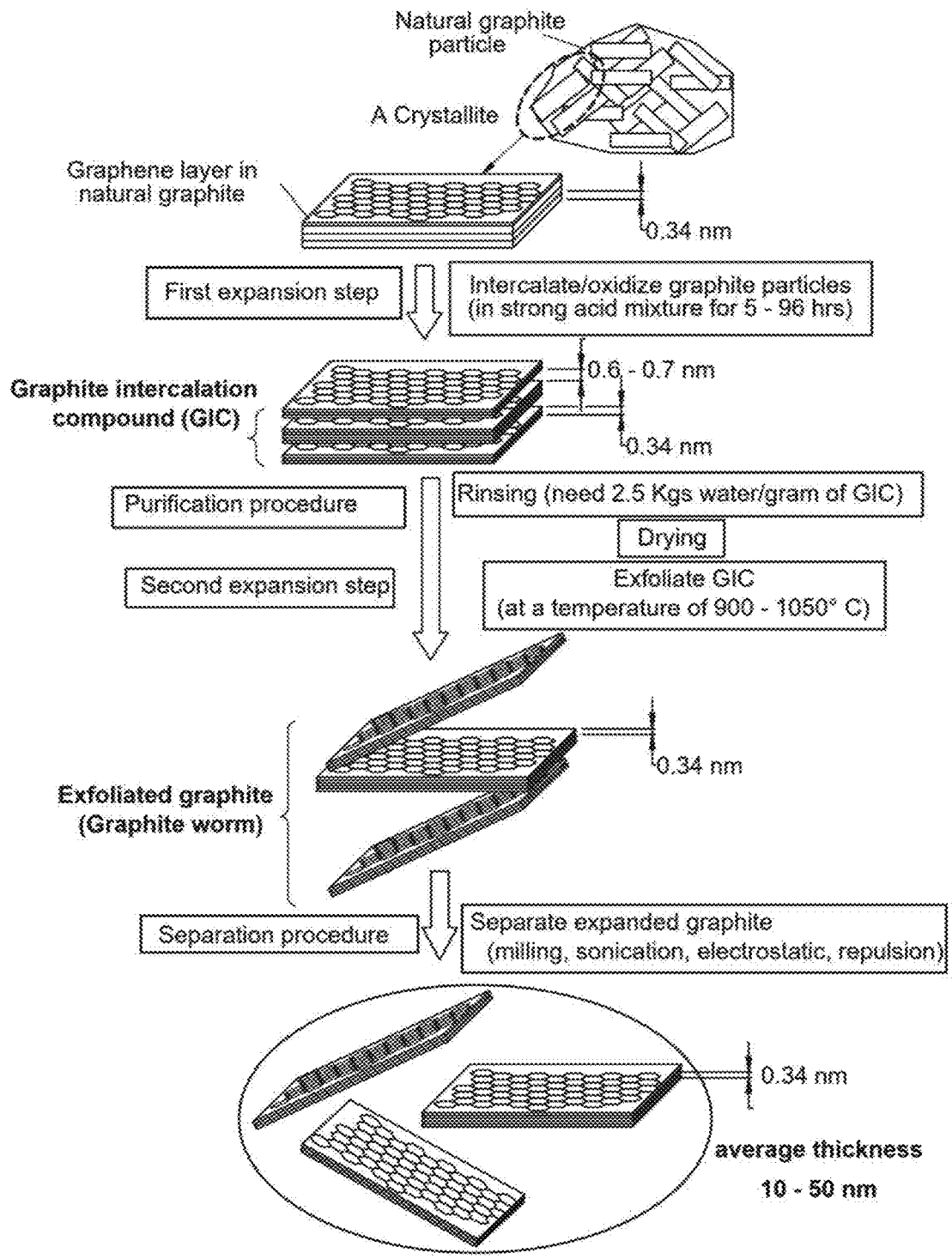
FIG. 1 A flow chart showing the most commonly used process for producing oxidized graphene sheets that entails chemical oxidation/intercalation, rinsing, and high-temperature exfoliation procedures.

The present invention provides a graphene-based aqueous coating suspension for use in protecting a metallic surface against corrosion or oxidation. This coating suspension may be applied to a metal substrate surface as a primer, a mid-coating layer, or a surface-coating layer (top-coating layer). In certain embodiments, this coating suspension comprises multiple graphene sheets, particles of an anti-corrosive pigment or sacrificial metal, and a waterborne binder resin dissolved or dispersed in water, wherein the multiple graphene sheets contain single-layer or few-layer graphene sheets selected from a pristine graphene material having essentially zero of non-carbon elements, or a non-pristine graphene material having 0.001% to 47% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. The non-pristine graphene material can have 1% to 30% by weight of non-carbon elements selected from O, H, N, F, Cl, Br, I, B, P, or a combination thereof. Preferably, the coating suspension does not contain microspheres (such as glass, ceramic, and polymeric microspheres) as a filler. In certain embodiments, the coating suspension does not contain a silicate binder.

In a preferred or typical coating composition (upon removal of water), the resulting solid contents contain 0.1%-30% by weight of graphene sheets, 1%-70% by weight (preferably 5%-60% and further preferably 10% to 40%) of particles of an anti-corrosive pigment or sacrificial metal, and 1%-10% by weight of a waterborne binder resin. Of course, the sum of the three species, however formulated, must be 100%.

A conventional anti-corrosive coating for protecting steel structures typically contains a zinc primer wherein zinc is used as a conductive pigment to produce an anodically active coating. The steel or iron substrate, to be protected, acts as the cathode. Zinc acts as a sacrificial anodic material that protects the steel or iron substrate. The resistance to corrosion presumably relies upon the transfer of galvanic current by the zinc primer. The steel substrate remains galvanically protected provided the electron-conducting pathways in the system are maintained and there is sufficient zinc to act as the anode. Unfortunately, zinc primers are typically formulated to contain a high loading of zinc particles (e.g. as high as 80% by weight of zinc). A high zinc loading means a high level of difficulty in dispersing solid contents in a liquid medium, difficulty in applying the primer onto steel surfaces to be protected, excessively thick and dense coatings, and high costs. Other coating systems for protecting other types of metallic structures also have serious drawbacks.

In the present invention, we have surprisingly observed that by adding 1% by weight of select functionalized graphene into the zinc primer one can curtail the Zn amount from 80% down to 20% by weight (a 4-fold reduction in Zn amount) without compromising the anti-corrosion capability. This is a dramatic improvement in performance and is totally unexpected. That 1% by weight graphene can completely replace 60% by weight zinc is stunning and unprecedented.

We have further observed that, in addition to zinc (or as an alternative to zinc), other elements or compounds such as aluminum, chromium, beryllium, magnesium, an alloy thereof, zinc phosphate, or a combination thereof can also be used as an anti-corrosive pigment or sacrificial metal to pair up with graphene sheets. The use of a small amount of graphene (typically from 0.1% to 10% by weight) can replace up to 70% by weight of these anti-corrosive pigment materials.

The waterborne binder resin may preferably contain a waterborne thermoset resin selected from water-soluble or dispersible epoxy resin, water-soluble or dispersible polyurethane resin, water-soluble or dispersible phenolic resin, water-soluble or dispersible acrylic resin, water-soluble or dispersible alkyd resin, or a combination thereof.

The coating suspension may further comprise other coating/paint ingredients as will be apparent to a skilled person in the art. Examples of such ingredients are fillers, additives (e.g. surfactants, dispersants, defoaming agents, catalysts, accelerators, stabilizers, coalescing agents, thixothropic agents, anti-settling agents, and dyes), coupling agents, extenders, conductive pigments, electron-conducting polymers, or a combination thereof. Again, the coating suspension does not contain microspheres of glass, ceramic, or polymer, etc. as a filler or additive.

The conductive pigment may be selected from acetylene black, carbon black, expanded graphite flake, carbon fibers, carbon nanotubes, mica coated with antimony-doped tin oxide or indium tin oxide, or a mixture thereof The electron-conducting polymer is preferably selected from the group consisting of polydiacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives, and combinations thereof Coating suspensions may be readily made by dispersing/mixing graphene sheets, particles of an anti-corrosive pigment or sacrificial metal, and a waterborne binder resin in water using well-known methods and equipment; e.g. using a disperser/mixer/homogenizer or an ultrasonicator.

Coating suspension may be applied onto a substrate surface using one of the many well-known coating/painting methods, such as air-assisted spraying, ultrasonic spraying, painting, printing, and dip coating. In certain embodiments, one may simply immerse or dip the metallic component in the graphene-based coating suspension and then removing the component from the graphene dispersion to effect deposition of graphene sheets and the binder onto a surface of the metallic component wherein the graphene sheets are bonded to the metal surface to form a layer of bonded graphene sheets. Alternatively, one may simply spray the coating suspension over the metallic component surface, allowing the water component to get vaporized and the binder resin to get cured or solidified.

The binder resin layer may be formed of an adhesive composition including an adhesive resin as a main ingredient. The adhesive resin composition may include a curing agent and a coupling agent along with the adhesive resin. Examples of the adhesive resin may include an ester resin, a urethane resin, a urethane ester resin, an acrylic resin, and an acrylic urethane resin, specifically ester resins including neopentyl glycol (NPG), ethylene glycol (EG), isophthalic acid, and terephthalic acid. The curing agent may be present in an amount of 1 to 30 parts by weight based on 100 parts by weight of the adhesive resin. The coupling agent may include epoxy silane compounds.

Curing of this binder resin may be conducted via heat, UV, or ionizing radiation. This can involve heating the heat-curable composition to a temperature of at least 70° C., preferably of 90° C. to 150° C., for at least 1 minute (typically up to 2 hours and more typically from 2 minutes to 30 minutes), so as to form a hard coating layer.

The metallic component surfaces may be brought to be in contact with the graphene dispersion using dipping, coating (e.g. doctor-blade coating, bar coating, slot-die coating, comma coating, reversed-roll coating, etc.), roll-to-roll process, inkjet printing, screen printing, micro-contact, gravure coating, spray coating, ultrasonic spray coating, electrostatic spray coating, and flexographic printing. The thickness of the hard coat layer is generally about 1 nm to 1 mm, preferably 10 nm to 100 µm, and most preferably 100 nm to 10 µm.

For thermally curable resins, the polyfunctional epoxy monomer may be selected preferably from diglycerol tetraglycidyl ether, dipentaerythritol tetraglycidyl ether, sorbitol polyglycidyl ether, polyglycerol polyglycidyl ether, pentaerythritol polyglycidyl ether (e.g. pentaerythritol tetraglycidyl ether), or a combination thereof. The bi- or tri-functional epoxy monomer can be selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-epoxycyclohexane) methyl 3,4-epoxycylohexylcarboxylate, derivatives thereof, and mixtures thereof.

In certain embodiments, the heat-curable compositions of the present invention advantageously further contain small amounts, preferably from 0.05 to 0.20% by weight, of at least one surface active compound. The surface active agent is important for good wetting of the substrate resulting in satisfactory final hard-coating.

The UV radiation curable resins and lacquers usable for the binder resin in this invention include those derived from photo polymerizable monomers and oligomers, such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth) acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

The UV polymerizable monomers and oligomers are coated (e.g. after retreating from dipping) and dried, and subsequently exposed to UV radiation to form an optically clear cross-linked abrasion resistant layer. The preferred UV cure dosage is between 50 and 1000 mJ/cm$^2$.

UV-curable resins are typically ionizing radiation-curable as well. The ionizing radiation-curable resins may contain a relatively large amount of a reactive diluent. Reactive diluents usable herein include monofunctional monomers, such as ethyl (meth)acrylate, ethylhexyl (meth)acrylate, styrene, vinyl toluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(m- eth)acrylate, 1,6-hexanediol di(meth)acrylate, neopentyl glycol di(meth)acrylate, derivatives thereof, and combinations thereof.

The aforementioned binder resins are normally solvent-based, being initially soluble in an organic solvent (prior to being cured or cross-linked). However, most of the monomers or polymers (prior to curing) in these binder resins can be chemically modified (e.g. carboxylated, hydroxylated, or somehow functionalized) to become soluble or dispersible in water. They then become ingredients of waterborne coating systems. There are intrinsically water-soluble or water-dispersible resin systems that are commercially available.

The preparation of graphene sheets and graphene dispersions is described as follows: Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nanofiller in a composite material and an electrode material in energy storage devices is imminent. The availability of processable graphene sheets in large quantities is essential to the success in exploiting composite, energy, and other applications for graphene.

The processes for producing NGPs and NGP nanocomposites were reviewed by us [Bor Z. Jang and A Zhamu, "Processing of Nano Graphene Platelets (NGPs) and NGP Nanocomposites: A Review," J. Materials Sci. 43 (2008) 5092-5101].

A highly useful approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nanofiber, carbon nanotube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. Na₄B) may be added to obtain reduced graphene oxide (RDO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

Graphene sheets have a significant proportion of edges that correspond to the edge planes of graphite crystals. The carbon atoms at the edge planes are reactive and must contain some heteroatom or group to satisfy carbon valency. Further, there are many types of functional groups (e.g. hydroxyl and carboxylic) that are naturally present at the edge or surface of graphene sheets produced through chemical or electrochemical methods. Many chemical function groups (e.g. $-NH_2$, etc.) can be readily imparted to graphene edges and/or surfaces using methods that are well-known in the art.

In one preferred embodiment, the resulting functionalized graphene sheets (NGP) may broadly have the following formula(e): [NGP]-$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si($-$OR'$-$)$_y$R'$_{3-y}$, Si($-$O$-$SiR'$_2-$)OR', R", Li, $AlR'_2$, Hg$-$X, $TlZ_2$ and Mg$-$X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

A commonly used curing agent for epoxy resin is diethylenetriamine (DETA), which has three $-NH_2$ groups. If DETA is included in the impacting chamber, one of the three $-NH_2$ groups may be bonded to the edge or surface of a graphene sheet and the remaining two un-reacted $-NH_2$ groups will be available for reacting with epoxy resin later. Such an arrangement provides a good interfacial bonding between the NGP (graphene sheets) and the epoxy-based binder resin.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, derivatives thereof, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The above-described [NGP]-$R_m$ may be further functionalized. The resulting graphene sheets include compositions of the formula: [NGP]-$A_m$, where A is selected from OY, NHY, O=C$-$OY, P=C$-$NR'Y, O=C$-$SY, O=C$-$Y, $-$CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'$-$OH, R'$-$NR'$_2$, R'SH, R'CHO, R'CN, R'X, R'N$^+$(R')$_3$X$^-$, R'SiR'$_3$, R'Si($-$OR'$-$)$_y$R'$_{3-y}$, R'Si($-$O$-$SiR'$_2-$)OR', R'$-$R", R'$-$N$-$CO, $(C_2H_4O-)_wH$, $(-C_3H_6O-)_wH$, $(-C_2H_4O)_w-$R', $(C_3H_6O)_w-$R', R', and w is an integer greater than one and less than 200. CNTs may be similarly functionalized.

The NGPs and conductive additives (e.g. carbon nanofibers) may also be functionalized to produce compositions having the formula: [NGP]-[R'-A]$_m$, where m, R' and A are as defined above. The compositions of the invention also include NGPs upon which certain cyclic compounds are adsorbed. These include compositions of matter of the formula: [NGP]-[X$-R_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]-[X-$A_a$]$_m$, where m, a, X and A are as defined above.

The functionalized NGPs of the instant invention can be directly prepared by sulfonation, or electrophilic addition to deoxygenated graphene platelet surfaces. The graphene platelets can be processed prior to being contacted with a functionalizing agent. Such processing may include dispersing the graphene platelets in a solvent. In some instances, the platelets or may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphene sheets or platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O$-$ or NH$-$ leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839

(1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

In some embodiments, the chemically functionalized graphene sheets contain a chemical functional group selected from alkyl or aryl silane, alkyl or aralkyl group, hydroxyl group, carboxyl group, amine group, sulfonate group (—SO$_3$H), aldehydic group, quinoidal, fluorocarbon, or a combination thereof. Alternatively, the functional group contains a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups, derivatives thereof,

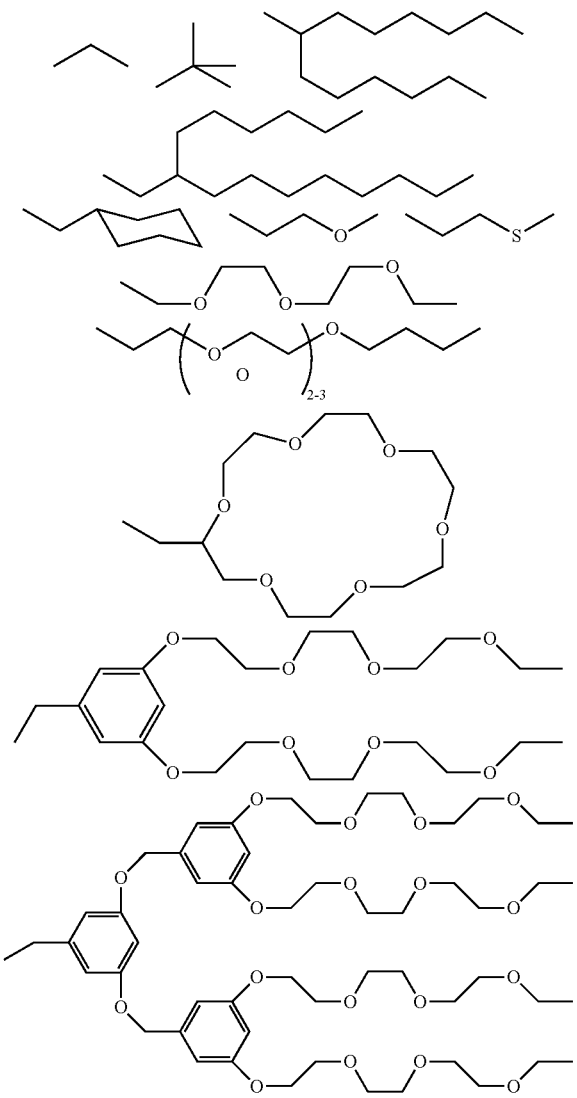

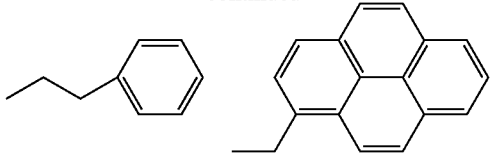

and combinations thereof.

In certain embodiments, the functional group is selected from the group consisting of hydroxyl, peroxide, ether, keto, and aldehyde. In certain embodiments, the functionalizing agent contains a functional group selected from the group consisting of SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—)OR', R'', Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, derivatives thereof, and combinations thereof.

The functional group may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

In some embodiments, the functional group may be selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—) OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The graphene dispersions produced may be further added with an acid, a metal salt, an oxidizer, or a combination thereof to prepare a more reactive dispersion for use in the graphene coating of a metallic component. One may simply dip a metallic component into the graphene suspension for a period of several seconds to several minutes (preferably 5 seconds to 15 minutes) and then retreat the polymer component from the graphene-liquid dispersion. Upon removal of the liquid (e.g. via natural or forced vaporization), graphene sheets are naturally coated on and bonded to polymer component surfaces.

The anti-corrosion coating systems were characterized by using methods that are well-known in the art; e.g. the salt spray test (SST) according to ASTM B117 (ISO 9277) and the cyclic voltammetry test (current density vs. voltage) to obtain the cathode and anode polarization currents, etc.

The following examples are used to illustrate some specific details about the best modes of practicing the instant invention and should not be construed as limiting the scope of the invention.

Example 1: Graphene Oxide from Sulfuric Acid Intercalation and Exfoliation of MCMBs MCMB (mesocarbon microbeads) were supplied by China Steel Chemical Co. This material has a density of about 2.24 g/cm$^3$ with a median particle size of about 16 µm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene sheets. A quantity of graphene sheets was mixed with water and ultrasonicated at 60-W power for 10 minutes to obtain a graphene dispersion.

A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Several graphene dispersions were separately added with a variety of anti-corrosion metals, other pigments and ingredients to produce various anti-corrosion coating compositions.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting suspension was subjected to ultrasonication for a period of 15 minutes to obtain dispersion of graphene oxide (GO) sheets.

Example 3: Preparation of Pristine Graphene

Pristine graphene sheets were produced by using the direct ultrasonication or liquid-phase exfoliation process. In a typical procedure, five grams of graphite flakes, ground to approximately 20 µm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free.

Examples 4: Preparation of Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

Example 5: Preparation of Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 6: Functionalized Graphene as an Anti-Corrosive Ingredient

Chemical functional groups involved in this study include an azide compound (2-azidoethanol), alkyl silane, hydroxyl group, carboxyl group, amine group, sulfonate group (—$SO_3H$), and diethylenetriamine (DETA). These functionalized graphene sheets are supplied from Taiwan Graphene Co., Taipei, Taiwan. Upon removal of water and cured at 150° C. for 15 minutes, graphene sheets were well bonded to metallic surfaces.

We have observed that, in general, the metallic component surfaces can be well-bonded to the presently invented functionalized graphene sheets with a waterborne binder resin. The coated surfaces are generally smoother if functionalized graphene sheets are included as an anti-corrosive pigment, along with an anodic metal such as Zn or Al, as compared to the use of the metal pigments alone.

Example 7: Polyurethane-Based Waterborne Binder Resin

Several hydroxyl/carboxyl functional polyurethane dispersions were prepared by a non-isocyanate process according to Scheme 1 shown below:

(SCHEME 1)

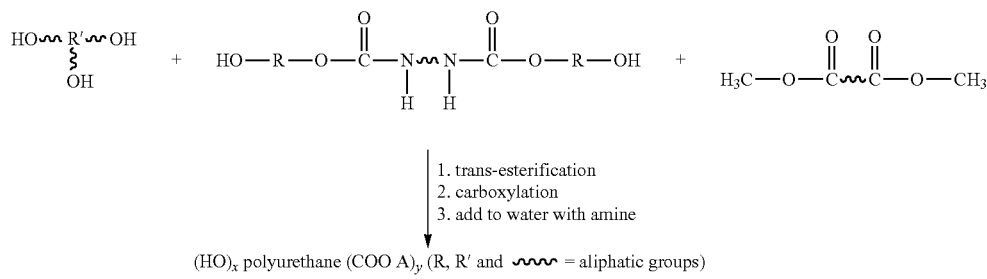

(HO)$_x$ polyurethane (COO A)$_y$ (R, R' and ⁓ = aliphatic groups)

The polymers were synthesized by first reacting the di-ester with the polyol in the presence of an organometallic catalyst at 200°-220° C. in vacuum. Methanol was the byproduct of the trans-esterification reaction. Subsequently, a hydroxyl-functional urethane diol was added, and propylene glycol was removed in vacuum at 180° C. The hydroxyl-functional urethane diol was prepared by a non-isocyanate process utilizing the reaction between a cyclic carbonate and a diamine. The resin was then carboxyl-functionalized and dispersed in water with the aid of a neutralizing tertiary amine. Number average molecular weights for the polyurethane dispersions were in the range of approximately 3000-4000 g/mole.

Example 8: Polyurethane-Urea Copolymer-Based Waterborne Binder Resin

Two polyurethane-urea dispersions were prepared by the prepolymer isocyanate process given in Scheme 2. This process actually produces a polyurethane-urea polymer. The chain extension reaction of the isocyanate terminated polyurethane with the diamine forms the urea moiety.

(SCHEME 2)

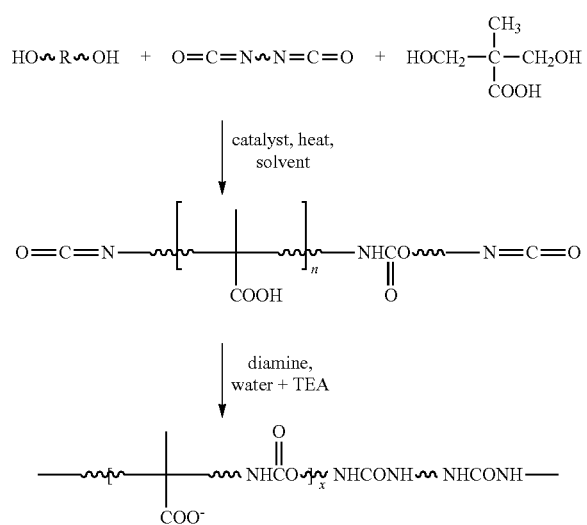

A melamine resin used as a cross-linker was a commercially available version of hexakis(methoxymethyl)melamine (HMMM), which has a degree of polymerization of about 1.5, an average molecular weight of 554, and an average theoretical functionality of 8.3. The waterborne acrylic dispersion used for formulating was Acrysol WS-68 from Rohm and Haas, a hydroxyl/carboxyl functional resin. A water-dispersible polyisocyanate from Bayer Corporation (Bayhydur XP-7007, a modified aliphatic isocyanate trimer) was used for crosslinking.

Example 9: Water-Soluble Alkyd Resin

In a typical procedure, a vessel equipped with a stirrer, a temperature controller and a decanter was charged with the following raw materials and the charge was heated with stirring: soybean fatty acid (33% by weight), trimethylolpropane (33%), trimellitic anhydride (8.5%), isophthalic acid 24%, dibutyltin oxide (0.5%), and xylene (1%). Water was formed as the reaction progressed and was removed azeotropically with the xylene. Heating was continued until an acid value of 39 and a hydroxyl value of 140 were attained. The reaction was then discontinued. The reaction mixture was diluted with butyl cellulosic to a non-volatile content of 70% by weight to give an alkyd resin varnish. This resin varnish was neutralized with triethylamine and adjusted to a non-volatile content of 40% by weight with deionized water to give a water-soluble alkyd resin varnish. This varnish had an effective acid value of 33.

Example 10: Waterborne Epoxy Resin

The waterborne epoxy used in this study was based on the "1-type" (epoxy equivalent weight of about 500-600) solid epoxy dispersion, and a hydrophobic amine adduct curing agent. Both components utilize a non-ionic surfactant that is pre-reacted into the epoxy and amine components. An example of such a waterborne epoxy was EPI-REZ 6520 (Hexion Specialty Chemicals Co.) with EPIKURE 6870 (modified polyamine adduct).

Figure 2:
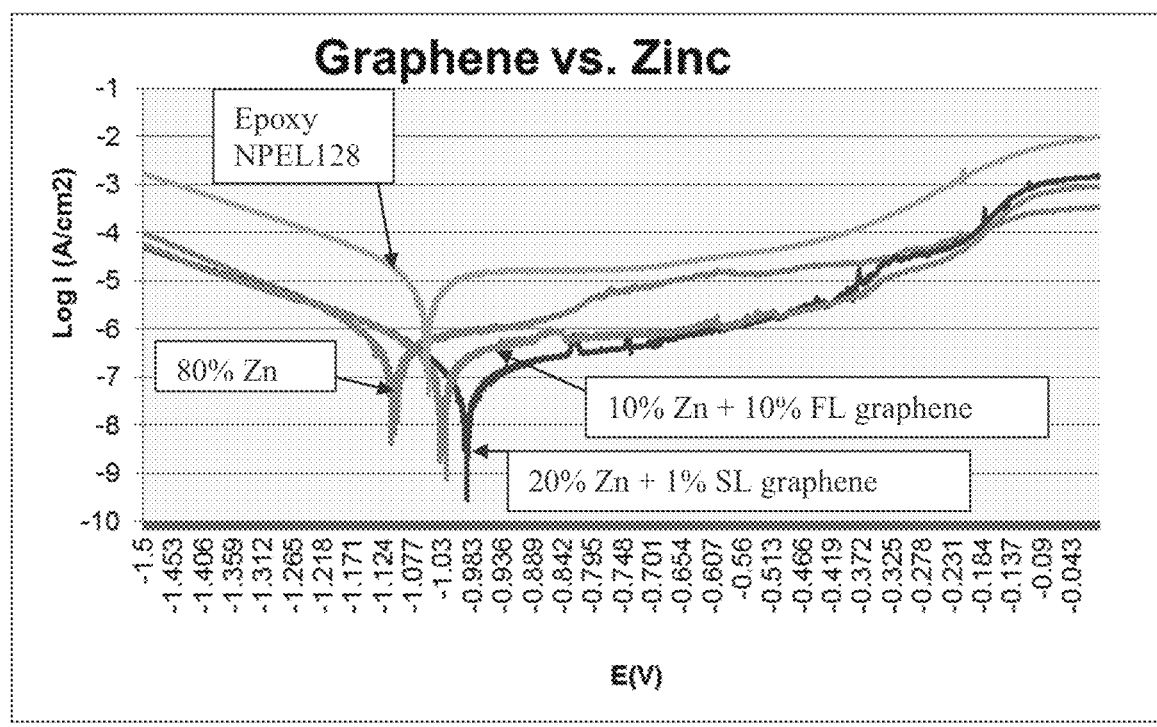
FIG. 2 The polarization current density vs. voltage (electrochemical potential) for four anti-corrosive coating compositions.

Some representative testing results are summarized in FIG. 2, which indicates that adding 1% by weight of select functionalized graphene sheets (single-layer graphene) into the zinc primer allows for reduction of the required Zn amount from 80% down to 20% by weight (a 4-fold reduction in Zn amount) without compromising the anti-corrosion capability. That 1% by weight of single-layer graphene can completely replace 60% by weight zinc is stunning and unprecedented. Also, 10% by weight of few-layer graphene can effectively replace 70% by weight of Zn. These dramatic improvements in performance are truly unexpected.

We have further observed that, in addition to zinc (or as an alternative to zinc), other elements or compounds such as aluminum, chromium, beryllium, magnesium, an alloy thereof, zinc phosphate, or a combination thereof can also be used as an anti-corrosive pigment or sacrificial metal to pair up with various types of graphene sheets. The use of a small amount of graphene (typically from 0.1% to 10% by weight) can replace up to 70% by weight of these anti-corrosive pigment materials.

We claim:

1. A graphene-based aqueous coating suspension comprising multiple graphene sheets, particles of an anti-corrosive pigment or sacrificial metal, and a waterborne binder resin dissolved or dispersed in water, wherein said multiple graphene sheets contain single-layer or few-layer graphene sheets selected from a pristine graphene material having essentially zero % of non-carbon elements, or a non-pristine graphene material having 0.001% to 47% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof and wherein said coating suspension does not contain a silicate binder or microspheres dispersed therein and wherein said graphene sheets have a weight fraction from 0.1% to 30% based on the total coating suspension weight excluding water, wherein said waterborne binder resin contains a waterborne thermoset resin selected from water-soluble or dispersible phenolic resin;
wherein the suspension further includes an electron-conducting polymer selected from the group consisting of polydiacetylene, polyacetylene (PAc), polyisothionaphthene (PITN), poly-p-phenylene (PpP), polyphthalocyanine (PPhc), and their derivatives, and combinations thereof.

2. The coating suspension of claim 1, wherein said non-pristine graphene material has 1% to 30% by weight of non-carbon elements selected from O, H, N, F, Cl, Br, I, B, P, or a combination thereof.

3. The coating suspension of claim 1, further comprising a carrier, filler, dispersant, surfactant, defoaming agent, catalyst, accelerator, stabilizer, coalescing agent, thixotropic agent, anti-settling agent, color dye, a coupling agent, an extender, a conductive pigment, or a combination thereof.

4. The coating suspension of claim 3, wherein said conductive pigment is selected from acetylene black, carbon black, expanded graphite flake, carbon fibers, carbon nanotubes, mica coated with antimony-doped tin oxide or indium tin oxide, or a mixture thereof.

5. The coating suspension of claim 1, wherein said chemically functionalized graphene comprises graphene sheets having a chemical functional group selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

6. The coating suspension of claim 1, wherein said chemically functionalized graphene comprises graphene sheets having a chemical functional group selected from a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

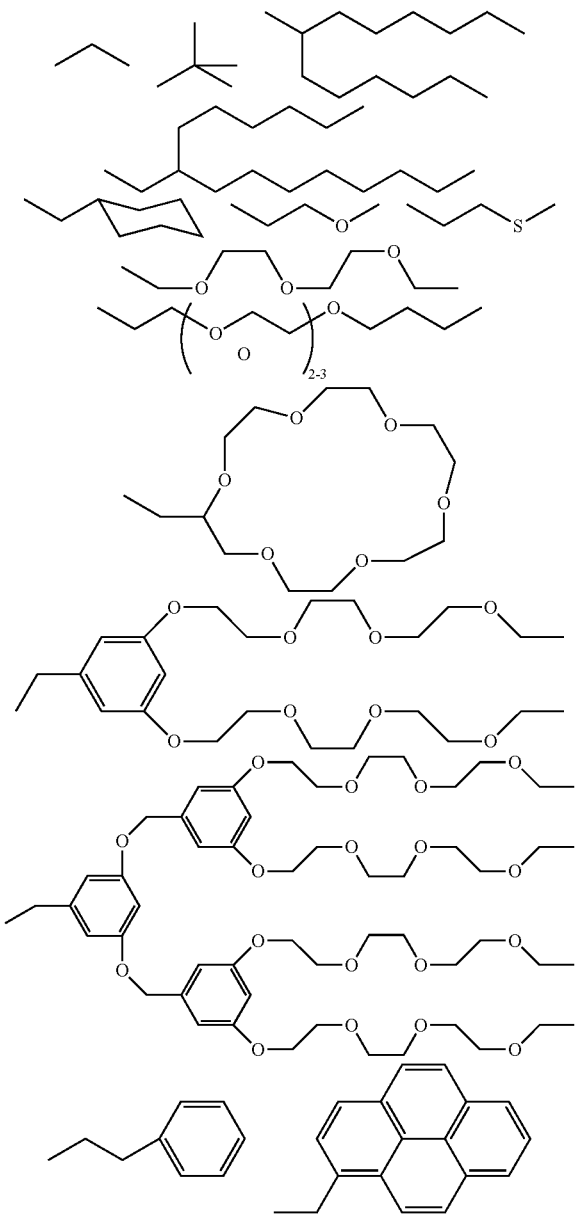

and combinations thereof.

7. The coating suspension of claim 1, wherein said chemically functionalized graphene comprises graphene sheets having a chemical functional group selected from an oxygenated group selected from the group consisting of hydroxyl, peroxide, ether, keto, and aldehyde.

8. The coating suspension of claim 1, wherein said chemically functionalized graphene comprises graphene sheets having a chemical functional group selected from the group consisting of $SO_3H$, COOH, $NH_2$, OH, R'CHOH, CHO, CN, COCl, halide, COSH, SH, COOR', SR, $SiR'_3$, $Si(—OR'—)_yR'_{3-y}$, $Si(—O—SiR'_2—)OR'$, R''', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

9. The coating suspension of claim 1, wherein said chemically functionalized graphene comprises graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

10. The coating suspension of claim 1, wherein said chemically functionalized graphene comprises graphene sheets having a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—) OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

\* \* \* \* \*